3,737,477
PROCESS OF PREPARING ETHYLENE-PROPYLENE COPOLYMER OILS
Richard S. Stearns, Malvern, Irl N. Duling, West Chester, and David S. Gates, Swarthmore, Pa., assignors to Sun Oil Company, Philadelphia, Pa.
No Drawing. Continuation-in-part of application Ser. No. 621,443, Mar. 8, 1967. This application Oct. 5, 1970, Ser. No. 78,190
Int. Cl. C07c *3/10*
U.S. Cl. 260—683.15 D          14 Claims

ABSTRACT OF THE DISCLOSURE

New ethylene-propylene copolymer oils containing 29–71 mole percent ethylene, the rest being at least substantially entirely propylene, said oils being of high viscosity index, low pour point, and high stability, are produced from monoolefin mixtures containing ethylene and propylene employing specified vanadium-aluminum or titanium-aluminum Ziegler-type catalyst systems. Hydrogen under pressure is used with vanadium-aluminum catalyst system to control molecular weight. Oils of lubricating oil viscosity can be produced directly, or after cracking higher molecular weight oil, said cracking usually, but not necessarily, followed by hydrogenating. Dewaxing can be employed to reduce pour point. Oil fractions have similar desirable lubricating oil properties as the overall copolymer oil.

BACKGROUND

This application is a continuation-in-part of our application S.N. 621,443 filed Mar. 8, 1967 and now abandoned. Also, related is commonly owned application S.N. 33,023 filed Apr. 29, 1970, and now abandoned, which discloses novel blended fluid lubricants containing our copolymer oils. The disclosure of these applications is hereby incorporated herein by reference.

Our copending application Ser. No. 78,191, filed Oct. 5, 1970 (now U.S. 3,676,521, issued July 11, 1972) claims certain novel ethylene-propylene copolymer oils containing 29–71 mole percent ethylene. Later-filed applications by us which contain claims which are related to inventions disclosed herein are Ser. No. 220,362, filed Jan 24, 1972 and Ser. No. 269,625, filed July 7, 1972.

This invention relates generally to new oily copolymers of ethylene and propylene useful for many purposes, and particularly to new synthetic lubricating oils having high viscosity indexes, high oxidation, shear and thermal stabilities, and low pour points, these properties being possessed not only by the overall oil, but also by its fractions. The invention includes the preparation of such oily copolymers through particular types of catalyst systems under defined reaction conditions.

The invention will be described more particularly in connection with the preparation of synthetic lubricating oils comprising copolymers of ethylene and propylene containing 29 to 71 mol percent ethylene, the rest being essentially propylene, more specifically from 40 to 60 mol percent ethylene, the rest being essentially propylene. It is to be understood, however, that monoolefin containing mixtures may be employed that contain, besides ethylene and propylene minor amounts of butene, and particularly butene-1, the latter being capable of entering into the copolymer molecule along with ethylene and propylene without radically modifying the outstanding characteristics of the new copolymer oil produced. The other butenes are essentially inert in the reaction zone. Thus to the extent indicated, butene-1 may be regarded as the equivalent of propylene.

Throughout the specification and the claims ratios of ethylene to propylene are in mol percent. Ethylene and propylene contents of polymers and oils described in this invention were determined by the following method. An infrared spectrogram covering the region of the spectrum from 3200 to 2650 cm.$^{-1}$ was obtained on a thin film of the sample using a high resolution infrared spectrograph. The absorbance of the sample above the baseline was measured at 2950 cm.$^{-1}$ and 2852 cm.$^{-1}$. The ethylene content of the sample was then calculated by use of the formula $$\log \left( \frac{\text{Absorbance at 2950 cm.}^{-1}}{\text{Absorbance at 2853 cm.}^{-1}} \right)$$

$$= 0.6365 - 0.0120 \text{ (mol percent ethylene)}$$

It is known to copolymerize mixtures of olefins using a so-called Ziegler catalyst, i.e., a transition metal compound in combination with a metal alkyl or an alkyl metal halide. The possible combinations not only of these catalyst components, but also of the components of olefin mixtures, however, are so vast that such knowledge is of very little, if any, use as a guide to the production of oily copolymer, including fractions thereof, eminently suited to meeting highest quality lube oil specifications, from specified olefin mixtures, such as of ethylene and propylene, in a desired range of component ratios, and without the production of excessive amounts of solids, and particularly solids in the form of fines difficult to separate.

It is well known that, in the production of synthetic hydrocarbon lubricating oils, the attainment of high viscosity index is generally due to the presence in the overall oil of high molecular weight polymer ends, it being not at all uncommon for distillate fractions of an overall oil having say an ASTM viscosity index of 125 to have viscosity indices below 100, the residue or bottoms retaining a high viscosity index. This presents an extremely distressing problem in marketing, for the trade demands oils of different viscosity characteristics, but nevertheless of highest quality, particularly in the case of motor oils. This has led, in some instances, to the production of high molecular weight polymer for blending purposes to improve viscosity and viscisity index of lower viscosity and viscosity index oils, a practice which is not free from shortcomings.

Reference to molecular weight throughout this specification and in the claims means number average molecular weight, as is customary.

Other serious problems concern stability, and particularly thermal stability, for in an increasing number of today's high temperature operations, thermal stability is of utmost importance.

SUMMARY OF THE INVENTION

The invention resides in new copolymer oil, including distillate fractions thereof, containing 29–71 mol percent ethylene, the rest being at least substantially entirely propylene, and particularly in new copolymer oil containing 40–60 mol percent ethylene, the rest being essentially propylene. Still more particularly, the invention resides in a copolymer oil of the foregoing composition having a viscosity at 210° F. of 1–60 cs., a minimum ASTM D–2270 viscosity index of 110, a maximum pour point of 0° F., excellent oxidation and shear stabilities, and for a synthetic oil outstanding thermal stability. The invention also resides in processes for the production of the above oils employing for the copolymerization of ethylene and propylene either a selected vanadium-aluminum or a selected titanium-aluminum Ziegler-type catalyst system, hydrogen under pressure being present to control molecular weight when employing a selected vanadium-aluminum catalyst. Copolymer oil within the above viscosity range can be produced directly by using sufficiently high hydrogen pressure with the vanadium-aluminum catalyst system, or indirectly by first producing copolymer oil of higher molecular weight and viscosity, using lower hydrogen pressure with the vanadium-aluminum catalyst system, or by using the titanium-aluminum catalyst system without hydrogen pressure, either being followed by cracking the copolymer oil thus produced. Hydrogenating the cracked product can be practiced to reduce unsaturation. Dewaxing can be employed, if and when necessary, or in any case if desired, to lower pour point to meet the above specifications, or otherwise.

Each catalyst system is comprised of two components. One which is common to both systems is:

(1) An aluminum alkyl halide, such as aluminum di-alkyl monochloride (AlR$_2$Cl), aluminum monoalkyl dichloride (AlRCl$_2$), or aluminum alkyle sesquichloride (Al$_2$R$_3$Cl$_3$).

The other component of the vanadium-aluminum catalyst system is:

(2) A compound having the formula

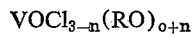

wherein R represents an alkyl radical, and wherein $n$ has the value of zero, one or two.

Whereas, the other component of the titanium-aluminum catalyst system is:

(3) Titanium tetrachloride.

The alkyl groups in the aluminum compound preferably contain from one to ten carbon atoms, and can be straight chain or branched chain alkyl groups. Examples of alkyl groups are methyl, ethyl, propyl, butyl, pentyl, hexyl, heptyl, octyl, nonyl and decyl, including the various isomers.

The alkyl groups in the vanadium compound also preferably contain from one to ten carbon atoms, and the characterization and examples given above as to alkyl groups in the aluminum compound apply equally.

DESCRIPTION OF THE PREFERRED EMBODIMENTS

When employing the vanadium-aluminum catalyst system, the reaction is carried out in the presence of a chain transfer promoter, e.g., hydrogen, for the control of copolymer molecular weight. Generally speaking, the higher the hydrogen pressure, the lower the molecular weight of the copolymer.

In a typical reaction procedure, a closed reactor, such as an autoclave, is charged with a suitable solvent. The reactor is then pressured with hydrogen to a desired pressure; then with propylene and ethylene to desired pressures. Charging of the catalyst components can be accomplished in a variety of ways, but customarily the reaction is not initiated until after the original charge of reactants. Since the reaction is somewhat exothermic, facilities for the control of temperature conditions are preferably provided for affording reasonably constant reaction temperatures, thus facilitating control of the ratio of monomers entering into the copolymer. Reaction temperatures between 0–125° C. are suitable, with 15–55° C. preferred.

As brought about above, in the case of the vanadium-aluminum catalyst system undergoing particular description, the molecular weight of the resulting copolymer is a function of the hydrogen pressure. It is also a function of the degree of agitation of the reaction mass, i.e., the rate of transfer of hydrogen to the active site, increasing agitation reducing the hydrogen pressure required for the production of copolymer of a given molecular weight, and reducing the molecular weight of copolymer produced under a given hydrogen pressure.

After the reaction has proceeded to a desired extent, the catalyst is deactivated by any suitable means, e.g., by addition of an alkanol such as isopropanol, and the copolymer recovered, such as by known methods, including removal of catalyst residues.

An outstanding feature of the invention is that by the use of sufficiently high hydrogen pressures during the reaction, e.g., above 250 p.s.i.g with agitation, lubricating oils having viscosities in the range useful for internal combustion engine lubrication can be produced directly, without need for further processing to reduce unsaturation, or to reduce molecular weight. If desired, these oils may be fractionationed into fractions of different viscosities to meet various demands, another outstanding feature of the invention being that the fractions retain the overall desirable properies of the original copolymer oil, e.g., after topping to remove light ends.

The invention, however, affords wide versatility in the control of molecular weight, making available the production of copolymer of higher than the desired final molecular weight, e.g., of 900–4000 M.W., by reduction in hydrogen pressure and/or agitation, followed by cracking, e.g., thermally, to yield product of desired molecular weight. This can be followed by hydrogenation to reduce unsaturation, to yield overall copolymer, e.g., after topping, and fractions, having similar highly desirable characteristics as those resulting from the above-described direct molecular weight control, and advantageously with improved product distribution in the overall oil, i.e., higher yield within desired product molecular weight range.

By appropriate control of the ratio of ethylene to propylene in the copolymer, oils of surprisingly high viscosity indexes together with low pour points are produced. For example, oils containing from say 30 to 60 mol percent ethylene and 70 to 40 mol percent propylene generally exhibit viscosity indexes in the range of from about 110 to about 160 ASTM, with pour points below about 0° F., without dewaxing. By narrowing the range of ethylene to say 40 to 50 mol percent, pour points below about −40° F. are made available, without dewaxing, with viscosity indexes above 115. The specification for viscosity index used herein, and in the claims, is ASTM D–2270.

Generally speaking, in the practice of the invention, viscosity index and pour point both increase with increase in percentage of ethylene in the copolymer, viscosity indexes approaching 175 being obtainable at about 70% ethylene, but with pour points far too high for normal use as internal combustion engine lubricants. In such cases dewaxing is practiced to yield highly superior oil of desirably low pour point.

It is here again that the versatility of the invention is demonstrated, for when it is desired to produce oily copolymers of exceeding high viscosity index, but with acceptable pour points, the latter is made available without abnormal effort through the step of dewaxing the oily copolymers, a step which in any event can be practiced, if desired, in connection with any of the oils to which the invention relates.

The above-identified Ziegler-type catalyst combinations, under the conditions of reaction employed, including the relative percentages of monomers present, are predominantly non-stereo-specific and non-isomerizing, considering their Lewis acid character. Thus linearity is achieved with a minimum of isomerization, and side chains attached to the copolymer backbone predominantly have an atactic, that is random, arrangement, i.e., there is predominantly no definite pattern or relationship with respect to any groups which may be around the backbone carbon chain. But with increase in propylene percentage in the copolymer above 71%, stereo-specificity and/or isomerization to the extent that they become significant, also appear to increase seemingly with increasing formation of isotactic blocks of polypropylene, to yield copolymer of increasingly higher pour point, and of increasingly lower viscosity index. On the other hand, increase in ethylene percentage in the copolymer above 71% apparently increases the linear character of the copolymer molecule to the extent that blocks of ethylene units appear to an undesirable degree with formation of increasingly higher amounts of waxy material which crystallizes to give pour points so high as to make dewaxing impracticable. Undue formation of blocks in the polymer backbone is avoided by the use of the catalyst combinations described herein, and by control of monomer mol ratios in the reaction zone, as will be hereinafter more particularly illustrated. By the use of the process of the invention, surprisingly low glass transition temperatures are obtained for the resulting oil upon the copolymerization of ethylene and propylene, with increasingly higher viscosity indexes following increasingly lower glass transition temperatures.

For best results, it is preferred that the two components of the catalyst system be present in certain ratios. Thus for obtaining high quality products in good yield, the aluminum compound and the vanadium compound ought to be used in amounts such that the atomic ratio of Al to V is in the range of 1–14 to 1, e.g., 10 to 1.

The weight ratio of olefin charge to vanadium compound used in the reaction mass can vary widely, ranging, for example, from 100:1 to 1000:1, optimum ranges depending more or less upon the purity of the olefin charge, the ratio of ethylene to propylene, the absence or presence of a solvent, the type of solvent used, and the particular aluminum compound employed.

Generally speaking, the yield of copolymer based on catalyst increases with increasing ethylene content in the copolymer. Catalyst efficiencies in grams of topped oil per gram of vanadium catalyst of 150–375 are readily obtained in the laboratory with considerably higher efficiencies available in large scale operations.

The polymerization reaction can be carried out either with or without a solvent being present.

When no solvent is used, the olefin charge itself, and particularly the propylene, functions as the reaction medium. Alternately, the reaction can be carried out in the presence of a solvent that is inert for practical purposes in the reaction zone. Suitable solvents can be various hydrocarbons, or certain types of halohydrocarbons.

When a hydrocarbon solvent is used, the general properties of the copolymer oils obtained are substantially the same as when no added solvent is employed. On the other hand, the use of a halohydrocarbon solvent tends to shift the product molecular weight downwardly, and yield oils of lower viscosity.

When a hydrocarbon solvent is used, it can be a paraffinic hydrocarbon, including the various isomers, or a naphthenic or aromatic hydrocarbon, or mixtures thereof. Examples are n-pentane, isopentane, hexanes, octanes, decanes, cyclohexane, methylcyclopentane, dimethylcyclohexane, benzene, toluene, xylene, and the like.

Examples of halohydrocarbons that are suitable are chlorobenzene, dichlorobenzene, and the like.

Operating in both laboratory and pilot plant equipment, ethylene-propylene oils of $KV_{210}=7$ to 60 cs. and molecular weights of 300–800 were readily produced by use of hydrogen pressures ranging from 500 to 1000 p.s.i.g. with agitation. These oils, after treatment for the killing and removal of catalyst, required only topping and fractionation to obtain a series of oils of different desired viscosities and of high viscosity indexes, hydrogenation having occurred during the chain transfer reaction.

On the other hand, when a hydrogen pressure of 20–25 p.s.i.g. was maintained on the reactor to promote chain transfer, copolymer of moderately low molecular weight (e.g., 1500–4000) was obtained, which was actually a very heavy oil. To obtain fractions of desired lube oil viscosities, this oil, after treatment for the killing and removal of catalyst, was thermally cracked, under reduced pressure, for example, in a vacuum still using pot temperatures of about 350–450° C. and pressures of about 0.1–5 mm. Hg. The overhead product was hydrogenated, by conventional means, e.g., by using Raney nickel at 150° C. with hydrogen at 2000 p.s.i.g., or palladium at 275° C. with hydrogen at 1500 p.s.i.g., for about 6 hours.

The hydrogenated products were finished oils in all respects comparable to the oils produced directly under high hydrogen pressure, and likewise required only topping and fractionation to obtain a series of oils of different desired viscosities and of high viscosity indexes.

It is to be understood that the finished oils obtained directly, or after cracking and hydrogenation, can be used, after topping, without fractionation, if desired, or even without topping. Topping is generally practiced to remove light ends which find uses as non-viscous lubricants, and in other applications requiring low molecular weight, saturated oily materials. It is also to be understood that the cracked products find use without hydrogenation for many purposes, such as in moderate service, particularly if stabilized by the addition of one or more inhibitors, e.g., an oxidation inhibitor.

Typically the total topped oils produced as the result of the above-described cracking and hydrogenation procedure can be made to have viscosities ranging from $KV_{210}=1$ cs. to 60 cs., depending upon the severity of the cracking operation. The yield of oil within the desired lube oil range ($KV_{210}=2$–10 cs.) has been as high as 80% or higher.

In a typical run a topped thermally cracked hydrogenated oil of $KV_{210}=5.5$ cs. was obtained. Seventy percent of the untopped oil had viscosities of $KV_{210}=2.0$–7.5 cs. upon fractionation, and the residue or bottoms comprising 19% had a viscosity of only $KV_{210}=11$ cs. This demonstrates a very favorable product distribution, as does the fact that 86% of another oil had a $KV_{210}$ between 2 and 10 cs.

It is found that residue or bottoms can be used as a VI improver, as can any of the oils or oil fractions. On the other hand, the residue or bottoms are excellently adapted for recycling through the thermal cracking and hydrogenation stages, if desired. Likewise, the residue or bottoms resulting from the fractionation of oils obtained directly under high hydrogen pressure can be similarly employed, or similarly subjected to thermal cracking and hydrogenation.

Dewaxing, when desired, may be carried out in any suitable manner, including temperature reduction, and can employ procedures known in the petroleum oil industry for the dewaxing of petroleum lubricating oil fractions. Dewaxing is conveniently carried out before fractionation either on the topped or untopped oil, and, generally speaking, does not change VI to a significantly large extent, if at all, from a practical point of view. On the other hand, adding of pour point depressants can be employed if desired, with or without the step of dewaxing, for the purpose of obtaining an oil of desirably low pour point.

The results of the use of hydrogen pressure for the reduction of viscosity and molecular weight in the practice of the invention are in a sense phenomenal as can be seen from the following data. The copolymer product obtained with zero hydrogen pressure was an elastomeric solid, whereas under a hydrogen pressure of 25 p.s.i.g. the resulting oily copolymer product had a $KV_{210}$ of 250 cs., and under a hydrogen pressure of 465 p.s.i.g. the $KV_{210}$ of a series of copolymer products fell between 20–50 cs.

The basic experimental equipment and procedures employed in obtaining the data set forth in Tables 1–7 below were as follows. A Parr stainless steel reactor, after flushing with hydrogen, was charged with hexane and an aluminum alkyl halide. The reactor was then pressured with hydrogen, propylene, and ethylene in that order to the desired pressures. The oxygen-containing vanadium compound was then added.

The mol ratio of monomeric ethylene to monomeric propylene maintained in the reaction zone to obtain a copolymer containing a desired ratio of ethylene to propylene is a function of their relative reaction rates under the conditions of reaction. These relative reactivities are readily determined, and are used herein to arrive at the appropriate ethylene to propylene monomer ratio in the reaction zone for the production of the desired copolymer. It will be understood, however, that precision is somewhat subject to trial, since the relative reactivities of ethylene and propylene vary, sometimes rather widely with change in reaction conditions, e.g., with the specific catalyst combination employed.

A convenient guide is set forth in an article by M. Fineman and S. D. Ross, J. Polymer Sci., 5, 269 (1950), which deals with the relative reaction rates of reactants in copolymerization reactions. Employing this guide R. D. Bushick has determined the reactivity ratio values for copolymers of ethylene and propylene prepared with various soluble catalyst systems, the data of which are set forth in an article in the above publication, volume 3, pp. 2047–2054 (1965).

As an example, the reactivity ratio value for a catalyst system consisting of diethoxy-chloro-vanadate and diisobutylaluminum chloride is 18.9 for ethylene and 0.056 for propylene. Employing these values in connection with the other teachings of the above guides, to arrive at a copolymer containing 55 mol percent ethylene and 45 mol percent propylene, there would be maintained in the reaction zone a monomeric mol ratio of propylene to ethylene of approximately 15:1, somewhat subject to trial to arrive at the exact ratio in the copolymer.

The mol ratio of monomeric propylene to monomeric ethylene in the reaction zone increases with increase in propylene in the copolymer, and vice versa.

Typical copolymerizations were performed in a closed stainless steel reactor equipped with an agitator. The reactor was charged with 800 ml. of hexane followed by 0.005 mol of diisobutylaluminum chloride. The reactor was then charged with hydrogen to a predetermined pressure, the hydrogen connection then being removed. Propylene was then charged to provide the appropriate monomeric excess, it being highly soluble in the solvent present. The propylene connection was then removed. Then an ethylene/propylene feed gas mixture was charged and continuously fed. The total amount of propylene present at the beginning of the reaction, that is the mol ratio of monomeric propylene to monomeric ethylene in the initial total charge, was determined by the desired composition of the copolymer, and as the reaction proceeded the desired mol ratio of monomeric propylene to monomeric ethylene in the reaction zone was maintained by maintaining in the feed gas the same mol ratio of propylene to ethylene as in the copolymer formed. Hydrogen pressure was adjusted in accordance with the desired molecular weight of the copolymer. The reaction was started by adding 0.0005 mol of diethoxy-chloro-vanadate or vanadium oxytrichloride, conveniently in solution, e.g., in hexane, and blown into the reactor from a 50 ml. Hoke cylinder pressure with hydrogen. The atomic ratio of Al to V was 10 to 1.

In a number of runs, the use of an inert solvent, such as hexane, was omitted, the large excess of propylene functioning as a solvent for all practical purposes.

These runs being on a small scale, no provision was made for the replacement of hydrogen used up in the promotion of chain transfer. This would normally be provided for in plant scale operation.

The reaction between ethylene and propylene takes place essentially in the liquid phase, with the catalyst combination in solution when using the above vanadium system, pressure being maintained to maintain liquid reaction conditions. No significant amount of homopolymer of ethylene or propylene is formed.

Usually reaction was permitted to run until the take up of feed gas dropped significantly, or was essentially complete, whereupon the feed was discontinued and the catalyst killed, e.g., by the addition of an alkanol, typically 2 ml. isopropanol. The reactor was then opened and the reaction mass removed.

The reaction mass was then washed twice with 0.1 molar HCl, once with 0.1 molar NaHCO$_3$, and three times with distilled water, in the removal of catalyst residues.

Alternate methods were used for the recovery of copolymer from solution. In one method the solution was poured into four times its volume of acetone, whereupon the copolymer coagulated and was recovered by filtration. In the other method the solvent including unreacted monomer was removed by distillation.

When relatively high hydrogen pressure is employed during the copolymerization, the resulting oil is a finished oil ready for use, such as after topping to remove light ends, or the oil may be fractionated to obtain a series of oils of different viscosities.

In the case of the use of relatively low hydrogen pressure during copolymerization, recovery of the copolymer from solution is followed by cracking, e.g., thermal cracking for the reduction of molecular weight. This was carried out under reduced pressure, e.g., 1 mm. Hg pressure, with no significant reflux or fractionation, the pot temperature being about 400° C., and the resulting overhead temperature above 300° C.

Cracking was followed by hydrogenation, which was carried out either using Raney nickel at 150° C. and 2000 p.s.i.g. hydrogen, or palladium at 275° C. and 1500 p.s.i.g. hydrogen, in each case the time being about 6 hours. No difference was observed in the properties of product hydrogenated by either method.

Dewaxing when practiced was carried out by dissolving the copolymer in an inert solvent, e.g., a mixture of methyl ethyl ketone, benzene and toluene, followed by reduction in temperature, and eventual filtration.

In Table 1 are shown pour point, viscosity-temperature, and $KV_{210}$ data on a series of ethylene/propylene oils of varying composition, with some data interpolated. These oils were prepared using diisobutylaluminum chloride and diethoxy-chloro-vanadate in 10:1 Al to V atomic ratio, except in the case of the two oils containing 71% and 36% ethylene respectively, where the vanadium compound was vanadium oxytrichloride. The solvent was hexane and the hydrogen pressure was 25 p.s.i.g. Moderate agitation was employed. The resulting copolymer oils were cracked, hydrogenated, and then topped at 150° C. and 0.5 mm. Hg pressure. There was no further fractionation, and no dewaxing.

TABLE 1

| Percent ethylene | Pour point, °F. | ASTM-VI | $KV_{210}$ |
| --- | --- | --- | --- |
| 71 | 70 | 176 | 5.50 |
| 70 [1] | 64 | 174 | |
| 60 [1] | 0 | 157 | |
| 58.5 | −15 | 155 | 9.31 |
| 56.5 | −15 | 153 | 8.50 |
| 52.5 | −20 | 149 | 8.43 |
| 48 | −60 | 140 | 9.60 |
| 45.5 | −65 | 141 | 8.75 |
| 40 [1] | −60 | 125 | |
| 36 | −20 | 113 | 13.31 |
| 30 [1] | −46 | 113 | |
| 29 | −50 | 113 | 11.66 |

[1] Data interpolated.

Attention is directed to the sharp drop in pour point as the ethylene content of the copolymer decreases below 70% as well as to the sharp drop in viscosity index as the ethylene content decreases below 45%.

These data show that the pour point becomes very high at about 71% ethylene, clearly indicating that beyond that point dewaxing is not practical. To illustrate, at 83% ethylene, the pour point was 115° F.

Even at about 71% ethylene, dewaxing is essential for internal combustion engine lube oil purposes, but it is not an essential as the ethylene content drops to about 60% and below, and particularly to about 50%.

As the ethylene content of the copolymer drops below about 40%, this pour point becomes somewhat erratic, perhaps due to the formation of blocks of isotactic polypropylene, with about 30% ethylene or slightly below, i.e., 29%, as the lower practical limit for copolymer having acceptable combined properties of low pour point and high viscosity index.

Thus the useful copolymer oils of the invention contain from about 29 to 71% ethylene, the rest being at least substantially entirely propylene, a preferred range being from about 40 to 60% ethylene, with about 40 to 50% ethylene outstanding.

Three of the oils of Table 1, namely those containing 45.5%, 52.5% and 58.5% ethylene respectively, were fractionated by non-destructive distillation, and the data appear in Tables 2, 3 and 4. These data demonstrate that the excellent viscosity-temperature and pour point properties of the total topped oils are not due to a combination of high and low molecular weight fractions, but are inherent properties of the structure of the new copolymers produced.

The data of Table 2 are on the copolymer oil of Table 1 containing 45.5% ethylene.

TABLE 2

| Boiling range, °C. (0.5 mm. Hg) | Total | To 150 | 150–175 | 175–215 | 215–235 | 235–282 | Residue |
|---|---|---|---|---|---|---|---|
| $KV_{210}$, cs | 8.75 | | 2.25 | 2.79 | 3.56 | 5.27 | 13.40 |
| $KV_{100}$, cs | 57.0 | | 7.66 | 10.8 | 15.5 | 27.8 | 109.7 |
| ASTM VI D-2270 | 141 | | 116 | 113 | 123 | 136 | 130 |
| Pour point, °F | −65 | | <−70 | −40 | −40 | −40 | −40 |
| Molecular weight | 563 | | 320 | 363 | 408 | 481 | 722 |
| UV unsaturation: | | | | | | | |
| Abs. at 197 mµ | 0.060/mm. | | | | | | |
| Abs. at 260 mµ | 0.005/mm. | | | | | | |
| Weight percent | 100 | 0 | 2.4 | 6.1 | 7.8 | 21.2 | 62.6 |

The data of Table 3 are on the copolymer oil of Table 1 which contained 52.5% ethylene.

TABLE 3

| Boiling range,°C. (0.5 mm. Hg) | Total | To 150 | 150–175 | 175–215 | 215–235 | 235–282 | Residue |
|---|---|---|---|---|---|---|---|
| $KV_{210}$, cs | 8.43 | | | 2.77 | 3.58 | 4.805 | 13.1 |
| $KV_{100}$, cs | 51.9 | | | 10.26 | 15.0 | 23.8 | 99.4 |
| ASTM VI D-2270 | 149 | | | 127 | 135 | 136 | 141 |
| Pour point, °F | −20 | | | −40 | −35 | −30 | −25 |
| Molecular weight | 554 | | | 358 | 394 | 456 | 709 |
| UV unsaturation: | | | | | | | |
| Abs. at 597 mµ | 0.175/mm. | | | | | | |
| Abs. at 260 mµ | 0 | | | | | | |
| Flash point, °F | 475 | | | | | | |
| Fire point, °F | 520 | | | | | | |
| Weight percent | 100 | 0 | 0.4 | 7.7 | 7.2 | 23.9 | 60.8 |

The data of Table 4 below are on the copolymer oil of Table 1 which contained 58.5% ethylene.

TABLE 4

| Boiling range, °C. (0.5 mm. Hg) | Total | To 150 | 150–175 | 175–215 | 215–235 | 235–282 | Residue |
|---|---|---|---|---|---|---|---|
| $KV_{210}$, cs | 9.31 | | | 2.9 | 3.16 | 4.70 | 12.6 |
| $KV_{100}$, cs | 57.5 | | | 11.1 | 12.35 | 22.35 | 89.1 |
| ASTM VI D-2270 | 155 | | | 125 | 134 | 144 | 149 |
| Pour point, °F | −15 | | | <−70 | −20 | −5 | −5 |
| Molecular weight | 577 | | | 360 | 380 | 446 | 698 |
| UV unsaturation: | | | | | | | |
| Abs. at 197 mµ | 0.060/mm. | | | | | | |
| Abs. at 260 mµ | 0 | | | | | | |
| Weight percent | 100 | 0 | 0 | 3.7 | 5.2 | 18.7 | 72.4 |

The data of Table 5 show the results of dewaxing a 71% ethylene copolymer oil in solution in a mixture of 50% methyl ethyl ketone, 35% benzene and 15% toluene, at a temperature of −40° F., following conventional procedure including filtering and removal of solvent.

TABLE 5

| Boiling range, °C. (0.5 mm. Hg) | Total | To 200 | 200–225 | 225–250 | 250–275 | 275–300 | Residue |
|---|---|---|---|---|---|---|---|
| $KV_{210}$, cs | 5.41 | 2.715 | 3.58 | 4.69 | 5.95 | 7.50 | 10.8 |
| $KV_{100}$, cs | 25.1 | 9.94 | 14.9 | 22.2 | 31.1 | 44.0 | 72.3 |
| ASTM VI D-2270 | 172 | 128 | 137 | 145 | 152 | 149 | 149 |
| Pour point, °F | −35 | −25 | −25 | −25 | −25 | −25 | −25 |
| Molecular weight | 489 | 349 | 393 | 453 | 506 | 555 | 660 |
| Weight percent | 100 | 10.6 | 18.8 | 16.3 | 17.1 | 18.1 | 19.1 |

These data demonstrate that pour point is reduced through dewaxing without radically changing the properties of the overall copolymer oil, or its fractions. The pour point of the overall topped copolymer oil was reduced from 70° F. to −35° F. without difficulty.

A copolymer oil containing 42% ethylene and 58% propylene was subjected to the drastic 400° F. Micro Oxidation Stability Evaluation originally reported by S. B. Schexnaider in WADD Tech. Rept. 60–794 (December 1960), and the data obtained was compared to that on Super Refined Mineral Oil MLO–7277. An oxidation inhibitor comprising a mixture of an amine, catechol, and a metallic dithiocarbamate was added to each sample in equal amount, and the tests were conducted under the same conditions. The results are set forth in Table 6.

TABLE 6

| | Above copolymer oil | Super refined mineral oil MLO-7277 |
|---|---|---|
| Percent increase in $KV_{100}$, cs | 8.0 | 92.9 |
| Increase in neutralization No | 3.6 | 1.57 |
| Insolubles (grams per 100 ml.) | 2.2 | 0.81 |

The excellent oxidative stability of the copolymer oils of the invention, as evidenced by the above data, is surprising, particularly in view of the high oxidative stability of Super Refined Mineral Oil MLO–7277, and is contra to the general belief that branched copolymers are unstable.

In Table 7 appear comparative data on the thermal stabilities of (1) a copolymer oil containing 52.5/47.5 ethylene/propylene, and (2) Super Refined Mineral Oil MLO–7277. The 700° F. Thermal Stability specification set forth in MIL–H–27601A (USAF) (Jan. 7, 1966) was used.

In accordance with the latter specification a maximum allowable loss in $KV_{100}$, cs. viscosity after 6 hours is 25%. It will be noted that in the case of the copolymer oil of the invention, the loss was only 15.4%.

TABLE 7

| | 52.5/47.5 ethylene/ propylene | Super refined mineral oil MLO-7277 |
|---|---|---|
| $KV_{100}$, cs., before test | 27.2 | 71.80 |
| $KV_{100}$, cs., percent decrease | 15.4 | 24.1 |
| Neutralization No. increase | 0.00 | 0.04 |
| Appearance after test | Clear | Clear |
| Change in weight of metals, mg./cm.²: | | |
| M-10 tool steel | 0.02 | 0.12 |
| Naval bronze | 0.12 | 0.10 |
| 52100 steel | 0.02 | 0.12 |

The outstandingly excellent thermal stability of the copolymer oils of the invention, as evidenced by the above data, is likewise surprising, and is likewise contra to the general belief that branched copolymers are unstable. As is well known, synthetic oils frequently fail to meet a high standard of thermal stability, such as that of MIL-H-27601A.

Excellent results were also obtained when copolymer oils of the invention were subjected to severe shear tests. These tests were conducted in accordance with the "Proposed Method of Test for Shear Stability of Polymer- Containing Oils," ASTM Standards on Petroleum Products and Lubricants, Appendix XII, (1961), and in a 10-kc. magnetostrictive shear device at 84% power for eleven minutes at room temperature. Typically, a copolymer oil having a $KV_{100}$ of 13.18 cs., when subjected to this test, ended up with a $KV_{210}$ of 12.98 cs., showing very little change, that is, a decrease in $KV_{210}$ of not more than 5%, and more particularly not more than 3%, and consequently high shear stability. This test is referred to herein and in the claims as "The Herein Modified ASTM Proposed Method of Test for Shear Stability of Polymer-Containing Oils."

The following two examples illustrate the use of sufficiently high hydrogen pressure during copolymerization to yield lube oil directly without need of further processing to reduce unsaturation.

In these runs, conducted in batch, a large excess of each monomer was charged in desired ratio, and the reaction time kept relatively brief in order to avoid large change in ethylene to propylene monomer ratio during the reactions.

Example I

A dry two liter stainless steel reactor equipped with an agitator was charged with 1600 ml. of hexane, and 7.44 ml. of a 25% by volume solution of diisobutylaluminum chloride in hexane. The reactor was then closed, purged with hydrogen, and pressured with propylene to 60 p.s.i.g., then with hydrogen to 525 p.s.i.g., and then with ethylene to 545 p.s.i.g. in that order. Pressuring with propylene and hydrogen was discontinued when their respective pressures were reached. Then 2 ml. of a 6.6% by volume solution of diethoxychlorovanadate in hexane was blown into the reactor from a 50 ml. Hoke stainless steel cylinder pressured at 700 p.s.i.g., with hydrogen. The reaction mass was agitated for 15 minutes, whereupon the reaction was terminated by injecting into the reactor 10 ml. of isopropanol followed by agitation for 10 minutes. The reactor was then depressured, and the reaction mass treated for the removal of catalyst by washing with dilute HCl, then with dilute $NaHCO_3$, and then with distilled water. This was followed by the stripping of solvent from the product, and distillation to 150° C. at 1 mm. Hg pressure light ends. The resulting copolymer oil had properties as follows:

Percent ethylene _____ 60
$KV_{210}$, cs. _____ 20.75
ASTM VI D-2270 _____ 161
Pour point, °F. _____ -25
Iodine number _____ <0.1
Molecular weight _____ 706
Yield, g./g. $VOCl(OEt)_2$ _____ 194

Example II

A dry 5 gallon stainless steel autoclave equipped with an agitator was charged with 15 pounds of hexane, and 0.134 mole of diisobutylaluminum chloride in a 25% by volume solution in hexane. The autoclave was then closed, purged with hydrogen, and pressured with hydrogen to 40 p.s.i.g. Then propylene was charged to 120 p.s.i.g.; ethylene to 145 p.s.i.g.; and hydrogen to 745 p.s.i.g., in that order. Charging with hydrogen, ethylene and propylene was terminated when their respective pressures, as noted, were reached. 0.0134 mole of diethoxy-chloro-vanadate in the form of a 6.66% by volume solution in hexane was then blown into the autoclave from a Hoke stainless steel cylinder pressured with hydrogen. This was followed by thorough-going agitation for a period of 15 minutes, whereupon the reaction mass was ejected into a container containing an aqueous solution of ammonia to kill the catalyst. After separation of catalyst residues by filtration, the copolymer was topped to 150° C. at 2 mm. Hg pressure, to yield a product having properties as follows:

Percent ethylene _____ 44
$KV_{210}$, cs. _____ 7.57
ASTM VI D-2270 _____ 165
Pour point, °F. _____ -35
Molecular weight _____ 453

As brought out above, the new copolymer oils of the invention can be prepared using catalyst systems other than the vanadium catalyst systems. Another two-component catalyst system useful in preparing said copolymer oils is comprised of (1) an aluminum alkyl halide, such as those described above, and (2) titanium tetrachloride.

It is found that when the latter catalyst system is employed, copolymer of intermediate molecular weight, e.g. (900–4000), for later cracking and hydrogenation can be prepared without the use of hydrogen as a chain transfer agent. The direct production of copolymer oil of $KV_{210}=1-60$ cs. with this catalyst system is avoided, since such oils are unfortunately of relatively low viscosity index, a result believed to be due to excessive rearrangement or isomerization. To obtain copolymer of intermediate molecular weight, catalyst combinations of lower Lewis acid strength, i.e., of lower relative chlorine content, are employed, the molecular weight increasing with decrease in Lewis acid strength. Otherwise procedure and conditions can be similar to those particularly described above, to yield valuable copolymer oils approaching in quality those prepared with the vanadium catalyst system, which latter oils nevertheless, are definitely superior.

For best results, however, in obtaining quality products in good yield, the aluminum compound and the titanium compound ought to be used in amounts such that the atomic ratio of Al:Ti is in the range of 10:1 to 1:8, such as 4:1 to 1:1.

Other considerations are that when chlorobenzene is used as solvent instead of hexane, the molecular weight of the copolymer produced is generally lower, and the reaction rate higher. Also generally, as the chlorine content of the catalyst increases, the molecular weight, VI, pour point, and catalyst yield decrease.

The following examples are given by way of illustration.

Example III

A two liter stainless steel reactor cooled in a water bath and equipped with an agitator, after being purged with nitrogen and then scavenged of water, was charged with 1300 ml. of hexane, and 6 ml. of 1 molar $Al_2Et_3Cl_3$ in hexane. This was followed by purging and then pressuring to 10.1 p.s.i.g. with a feed mixture consisting of 60.8 mol percent of ethylene and 39.2 mol percent of propylene. After cutting off the source of the latter feed mixture, the reactor was then pressured to 15 p.s.i.g. with propylene. This was followed, after shutting off the source of the propylene, by pressuring to 25 p.s.i.g. with the above feed mixture, the source of which was left connected to the reactor during the reaction. The reaction was started by injecting 6 ml. of a one molar solution of $TiCl_4$ in hexane into the reactor, the atomic ratio of Al:Ti being 1:1. The reaction was permitted to run for somewhat more than 5 hours, whereupon the reactor was opened, flushed with 200 ml. of hexane, and the resulting product mixture stirred for one-half hour with 5 ml. of an aqueous solution of ammonia to kill the catalyst. The catalyst residue was removed by filtration, and solvent by distillation, to yield a copolymer oil having a $KV_{210}$ of 205.5 cs. and a molecular weight of 1059.

This oil was cracked, then hydrogenated to yield an oil containing 41% ethylene, and having a molecular weight of 533, a $KV_{210}$ of 7.95, an ASTM VI D-2270 of 132, and a pour point of -10° F. After being topped to 150° C. at 0.4–0.5 mm. Hg pressure, fractionation of the topped oil yielded the data set forth in the following table.

TABLE 8

| Boiling range, °C. (0.4-0.5 mm. Hg) | 150-175 | 175-215 | 215-235 | 235-263 | 263-291 | Residue |
|---|---|---|---|---|---|---|
| Percent ethylene | 39 | 40 | 41 | 41 | 42 | 43 |
| Molecular wieght | 301 | 353 | 430 | 514 | 599 | 806 |
| $KV_{210}$, cs | 2.088 | 2.974 | 4.548 | 6.63 | 9.38 | 18.84 |
| ASTM VI D-2270 | 106 | 113 | 121 | 126 | 126 | 121 |
| Pour point, °F | −5 | +10 | +30 | +35 | +5 | −15 |
| Weight percent | 3.1 | 17.5 | 12.8 | 15.7 | 15.9 | 35.0 |

Example IV

A two liter stainless reactor cooled, equipped purged and scavenged as in Example III, was charged with 1300 ml. of hexane, and 12 ml. of a one molar solution of diisobutylaluminum chloride in hexane. This was followed by purging and then pressuring to 10.3 p.s.i.g. with a feed mixture consisting of 61.1 mol percent of ethylene and 38.9 mol percent of propylene. The reactor, after shutting off the source of said feed mixture, was then pressured to 15.2 p.s.i.g. with propylene. This was followed, after shutting off the source of said propylene, by pressuring to 25.4 p.s.i.g. with the above feed mixture, the source of which was left connected to the reactor during the reaction. The reaction was started by injecting 6 ml. of a one molar solution of $TiCl_4$ in hexane into the reactor, the atomic ratio of Al:Ti being 2:1. The reaction was permitted to run for 4 hours and 40 minutes, whereupon the reactor was opened, flushed with hexane, and the resulting product mixture stirred with an aqueous solution of ammonia to kill the catalyst. The catalyst residue was removed by filtration, and solvent by distillation to yield a copolymer oil having a $KV_{210}$ of 180.8 cs., and containing 50% ethylene.

This oil was cracked, then hydrogenated, topped to 150° C., and further fractionated to yield fractions characterized by the following data.

TABLE 9

| Boiling range, °C. | Pressure, mm. Hg | Percent ethylene | Mol wt. | $KV_{210}$, cs. | ASTM VI D-2270 | Pour point, °F. |
|---|---|---|---|---|---|---|
| DIBAC/$TiCl_4$: | | | | | | |
| 150-175 | 2.0 | 39 | 267 | 1.59 | | |
| 175-215 | 2.4 | 40 | 311 | 2.17 | 117 | −20 |
| 215-242 | 2.4 | 41 | 366 | 3.14 | 123 | −25 |
| 242-257 | 2.4 | 42 | 411 | 4.22 | 131 | −20 |
| 257-274 | 2.7 | 44 | 460 | 5.38 | 137 | +15, +20 |
| Residue | | 49 | 664 | 12.43 | 134 | 0 |

The substitution in any of the foregoing runs, including those represented by tablets and examples, of another aluminum alkyl halide to which this invention relates, for the one specifically mentioned in said run, yields comparable results. Likewise the substitution in any said run in which a vanadium compound was used, of another vanadium compound to which this invention relates yields comparable results. The same applies to other substitutions within the scope of the invention as set forth herein, and in the claims.

While it is preferred that the copolymer shall have a composition consisting of 29-71 mol percent ethylene, or still more preferably one of the narrower ethylene ranges set forth herein, the rest being essentially propylene, that is, the rest being entirely propylene, except for a tolerance of up to one mol percent of butene in the copolymer, and still more preferred that the rest shall be entirely propylene, wider tolerances are possible without greatly altering the basic characteristics of the new copolymer oils, such as tolerances up to 5 mol percent butene, or even conceivably up to 10 mol percent of butene but no more. This is what is meant by the term "the rest being substantially entirely propylene" for, up to these wider tolerances, butene is considered to be an equivalent of propylene, so to speak, though not the equal, in imparting desirable properties to the copolymer.

Since butene-1 is less reactive, under the conditions of reaction, than propylene, this will be taken into consideration when preparing monomeric mixtures for polymerization, should it be desired to incorporate butene-1 into the copolymer, which is normally unlikely, or should it be desired to use a monoolefin mixture containing butene-1, without expending time and expense on its removal. It will be noted that the tolerance of butene-1 in the monomeric mixture subjected to copolymerization conditions in accordance with the invention can be relatively high without the incorporation of a large mol percent of butene-1 into the resulting copolymer. The other butenes are relatively inactive.

Good practice dictates care to avoid the presence of catalyst poisons in the reaction zone, such as those well known to be incompatible with Ziegler-type catalysts. Such poisons, incidentally include the diolefins, such as the butadienes, which should be taken into account when the starting material is derived from gaseous mixtures resulting from petroleum cracking operations.

From the foregoing, it can be seen that highly valuable new synthetic oils are provided having high viscosity indexes, low pour points, high oxidative and shear stabilities, and exceptionally high thermal stabilities, all of which being derived from the copolymerization of monomers expected to yield products of far lower quality and of far lower stabilities on the basis of the prior art. The surprisingly excellent properties of the product of the invention result, among other things, from relatively high linearity and random distribution of the monomers in the polymer chain, this being reflected in high viscosity indexes, and available low pour points.

A further advantageous property of the novel oils of the present invention is that copolymer oil distillate fractions having a $KV_{210}$ in the range of 1-60 cs. will have the high ASTM viscosity index (e.g. 110 or higher) which is a characteristic of the whole oil. Distillate fractions of the more preferred novel oils will also have a maximum pour point of 0° F. From the foregoing examples, it can be seen that this uniformity of the fractions can be observed when the whole oil is distilled, at reduced pressure (e.g. 20-0.1 mm.), to obtain a residue fraction and from 3 to 5 overhead fractions, said residue being in the range of about 15 (e.g. 19.1) to about 75 (e.g. 72.4) weight percent of the whole copolymer oil, each of the overhead fractions being in the range of about 2 to about 25 (e.g. 24) weight percent of the whole copolymer oil.

A preferred novel ethylene-propylene copolymer oil, of the present invention, has a $KV_{210}$ of 2-10 cs., a minimum ASTM viscosity index of 110 (typically 125 to 172), a minimum pour point of 0° F. (typically 0 to 65° F.), contains in the range of 29-71 mole percent of ethylene (preferably 40-71 mole percent), and has an ultraviolet absorptivity no greater than 0.2 (e.g. 0.175) at 197 millimicrons. This low ultraviolet absorptivity is evidence of the highly paraffinic character of such novel oils, which have very good thermal stability as evidenced by a maximum decrease in $KV_{100}$ of 25% when tested by military specification MILH-27601A (USAF). The oxidation stability of these novel paraffinic oils is also very good, as evidenced by any of the usual oxidation tests (such as the rotary bomb oxidation test, ASTM-2272).

The advantages and unique properties of the novel copolymer oils of the present invention can be more clearly seen when compared with the properties of prior art ethylene-propylene oils, as is illustrated by Examples V-VII (which follow).

Example V

Examples 18 and 19 of United States Patent 3,328,366 (to Nakaguchi et al.) were duplicated. Example 18 of Nakaguchi et al. involved polymerization of a gaseous mixture of 30 mol. percent ethylene and 70 mol percent propylene in methyl cyclohexane solvent, using a catalyst system of ethylaluminum dichloride, sulfuryl chloride and vanadyltrichloride. Example 19 of Nakaguchi et al. was similar to Example 18. The major differences of present interest being that the solvent was n-heptane and the feed mol ratio of ethylene to propylene was 20 to 80. The following Table 10 summarizes the properties of these Nakaguchi e al. products:

TABLE 10
TABLE 10.—NAKAGUCHI ET AL. PRODUCTS

|  | Example 18 | Example 19 |
|---|---|---|
| Methanol sol., wt. g | 17.5 | 20.0 |
| Methanol insol.: |  |  |
| Topped oil, wt. g | 24.5 | 22.2 |
| $KV_{210}$, cs | 88.0 | 30.1 |
| $KV_{100}$, cs | 601.3 | 605.3 |
| ASTM-VI (D2270) | 244 | 80 |
| VTF-VI | 166 | 82 |
| Pour point, °F | <−40 | +10 |
| Percent Ethylene | 40 | 23 |
| Distillate oil, wt. g | 7.5 | 4.1 |
| Total oil, wt. g | 32.0 | 26.3 |

The Example 18 product differs from our novel oils in that it has a very high viscosity. The Example 19 oil differs in having a low VI and a low percent ethylene. Furthermore, the high VI of the Example 18 oil is apparently caused by the well-known dumb-bell blending effect, rather than being uniformly high in distillate fractions.

Example VI

Example 1 of Belgium Pat. 570,843, to Farbwerke Hoechst Aktiengesellschaft, was repeated. This involved introducing 20 volume percent propylene and 80 volume percent ethylene into a chloroform solvent and then adding a catalyst system of titanium tetrachloride and methylaluminum sesquichloride (Al/Ti ratio 2:1). An oil product was obtained which had a $KV_{210}$ of 12.76 and an ASTM-VI of 137. However, distillation of this product revealed that the high VI was caused by "dumbbell blending," that is, the overhead fractions had viscosity indices in the range of 88–97. Furthermore, this oil product was very unstable when subjected to oxidation testing or thermal stability testing. For example, this product set up into a plastic mass under oxidizing conditions and had a 65% decrease in $KV_{100}$ when thermally tested at Ml-H-27601 conditions.

Example VII

Three attempts to duplicate Example IV of U.S. Pat. 3,068,306, to Hay et al. (involving a heptane solvent, an Al/Ti ratio of 1:3 and a feed of 85 mole percent propylene and 15 mole percent ethylene), produced, at best, only traces of oil. A further attempt, using extreme care to prevent contamination by traces of water or oxygen, resulted in the production of an oil having an ASTM VI of about 100, a $KV_{210}$ of about 5.4 and containing 87 mole percent propylene. When the oil was distilled the distillate fractions had ASTM VI's in the range of 41–47.

In the previously described catalyst system where the preferred Al:Ti atomic ratio is in the range of 4:1 to 1:1, traces of moisture can act as co-catalysts or promoters, although, of course, the usual precautions must be taken to insure that the reactor system has no leaks and that feed materials and catalyst components are substantially free of water or oxygen. However, with the low Al/Ti ratio systems, such as that of Hay et al., another degree of magnitude of care must be taken to insure freedom from harmful water or oxygen contamination.

In one preferred process the Al/Ti atomic ratio is at least 1:1 (e.g., 1.2:1), to provide sufficient Al-alkyl to insure reduction of the $TiCl_4$ (the preferred system being red-purple in color). One preferred Al/Ti ratio is 3:1. Strong cationic systems can also cause isomerization of the copolymer and, thus, reduce product quality. When the Al/Ti ratio is above about 4:1, solid isotactic polypropylene can form in some solvents (e.g. heptane), at the expense of copolymer, and the oil product should be filtered to remove this by-product. In such high Al/Ti ratio systems, a preferred solvent is chloroform. A high Al/Ti ratio in a paraffinic hydrocarbon solvent can also adversely affect such oil properties as the viscosity index and uniformity. In any event, the most critical process variable in producing the novel oils of the present invention, using a catalyst system comprising compounds of Al and Ti, is the ethylene to propylene ratio in the feed. As has been previously disclosed herein, with a given catalyst system the feed ratio should be adjusted by experiment to produce an oil of the desired ethylene and propylene content.

The invention claimed is:

1. Process of preparing a synthetic copolymer oil which comprises contacting a mixture comprising ethylene and propylene in liquid phase at a temperature in the range of 0–125° C. with a catalyst system formed from an aluminum alkyl chloride and titanium tetrachloride, said ethylene and propylene being maintained in the reaction zone for reaction in monomeric mol ratio to yield copolymer containing 29–71 mol percent ethylene, the rest consisting essentially of propylene, the chlorine content of said catalyst system being maintained such as to yield copolymer oil with average number molecular weight of 900–4000 and wherein said copolymer oil is subjected to pyrolysis to yield copolymer oil of lower average molecular weight than said original copolymer oil, having a $KV_{210}$ in the range of 1–60, and containing in the range of 29–71 mol percent ethylene.

2. The process of claim 1 wherein the aluminum alkyl chloride is aluminum alkyl sesquichloride, aluminum dialkyl monochloride, or aluminum alkyl dichloride, the catalyst system having an atomic ratio Al/Ti in the range of 10:1 to 1:8, and wherein the rest of the copolymer beside ethylene is substantially entirely propylene.

3. The process of claim 2 wherein the copolymer oil produced by said pyrolysis has an ASTM viscosity index of at least 110.

4. The process of claim 1 wherein the final copolymer oil is subjected to hydrogenation to yield a relatively highly saturated product.

5. The process of claim 4 wherein the pyrolysis and hydrogenation yield copolymer oil having a $KV_{210}$ of 1–60 cs. and having an ultraviolet absorptivity at 197 millimicrons in the range of 0.0 to 0.2.

6. The process of claim 3 wherein the pyrolysis is such as to yield copolymer oil which upon hydrogenation has a $KV_{210}$ of 1–10 cs. and contains in the range of 40–71 mol percent ethylene.

7. The process of claim 2 wherein each alkyl group has 1–10 carbon atoms, and wherein the rest of the copolymer besides ethylene is entirely propylene.

8. The process of claim 1 wherein said temperature is in the range of 15–55° C.

9. The process of claim 1 wherein the atomic ratio Al/Ti in said catalyst system is in the range of 10:1 to 1:8.

10. The process of claim 1 wherein the atomic ratio Al/Ti in said catalyst system is in the range of 4:1 to 1:1.

11. The process of claim 1 wherein said pyrolysis is conducted at a reduced pressure, and at a temperature of at least 350° C.

12. Process of claim 11 wherein said reduced pressure is in the range of 0.1–5 mm. Hg.

13. Process of claim 1 wherein the yield of oil having a $KV_{210}$ in the range of 2–10 cs., from said pyrolysis step, is at least 80%.

14. Process of claim 3 wherein said copolymer oil product of said pyrolysis step is subjected to a dewaxing step.

(References on following page)

References Cited

UNITED STATES PATENTS

| | | | |
|---|---|---|---|
| 2,372,001 | 3/1945 | Joyce | 260—88.2 S |
| 3,562,788 | 2/1971 | Weemes et al. | 260—88.2 S |
| 3,068,306 | 12/1962 | Hay et al. | 260—683.15 D |
| 3,168,588 | 2/1965 | White et al. | 260—683.15 D |

FOREIGN PATENTS

| | | | |
|---|---|---|---|
| 570,843 | 3/1959 | Belgium | 260—683.15 D |

PAUL M. COUGHLAN, JR., Primary Examiner

U.S. Cl. X.R.

260—683 R, 683.9